United States Patent
Okada et al.

(10) Patent No.: US 11,811,052 B2
(45) Date of Patent: Nov. 7, 2023

(54) POSITIVE ELECTRODE ACTIVE MATERIAL FOR NON-AQUEOUS ELECTROLYTE SECONDARY BATTERY

(71) Applicant: SUMITOMO METAL MINING CO., LTD., Tokyo (JP)

(72) Inventors: Jiro Okada, Chiba (JP); Tetsufumi Komukai, Ehime (JP); Jun Yokoyama, Ehime (JP); Takahiro Ogawa, Ehime (JP); Tomoko Nakayama, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 468 days.

(21) Appl. No.: 17/042,431

(22) PCT Filed: Mar. 28, 2019

(86) PCT No.: PCT/JP2019/013843
§ 371 (c)(1),
(2) Date: Sep. 28, 2020

(87) PCT Pub. No.: WO2019/189679
PCT Pub. Date: Oct. 3, 2019

(65) Prior Publication Data
US 2021/0119201 A1 Apr. 22, 2021

(30) Foreign Application Priority Data
Mar. 29, 2018 (JP) ................................. 2018-065969

(51) Int. Cl.
*H01M 4/134* (2010.01)
*C01G 53/00* (2006.01)
(Continued)

(52) U.S. Cl.
CPC ............ *H01M 4/134* (2013.01); *C01G 53/50* (2013.01); *H01M 4/131* (2013.01); *H01M 4/366* (2013.01);
(Continued)

(58) Field of Classification Search
CPC ....... C01G 53/42; C01G 53/50; H01M 4/134; H01M 4/131; H01M 4/366; H01M 4/505;
(Continued)

(56) References Cited

U.S. PATENT DOCUMENTS 10,784,507 B2 *  9/2020  Furuichi ............... H01M 4/628
11,063,257 B2 *  7/2021  Yokoyama ........... H01M 4/366
(Continued)

FOREIGN PATENT DOCUMENTS

| CN | 1985390 | 6/2007 |
| CN | 102460787 | 5/2012 |

(Continued)

OTHER PUBLICATIONS

International Search Report dated Jul. 2, 2019 with respect to PCT/JP2019/013843.
(Continued)

*Primary Examiner* — Milton I Cano
*Assistant Examiner* — Oscar Londono
(74) *Attorney, Agent, or Firm* — IPUSA, PLLC (57) ABSTRACT

The present invention provides a positive electrode active material for a non-aqueous electrolyte secondary battery including a lithium metal composite oxide powder represented by a general formula: $Li_zNi_{1-x-y}Co_xM_yO_{2+\alpha}$, wherein $0<x\leq0.35$, $0\leq y\leq0.35$, $0.95\leq z\leq1.30$, $-0.15\leq\alpha\leq0.15$, and M is at least one element selected from Mn, V, Mg, Mo, Nb, Ti and Al; and a coating layer placed on particle surfaces of the
(Continued)

lithium metal composite oxide powder; wherein the coating layer is a mixed-phase of a crystalline phase and an amorphous phase.

4 Claims, 4 Drawing Sheets

(51) Int. Cl.
*H01M 4/131* (2010.01)
*H01M 4/36* (2006.01)
*H01M 4/505* (2010.01)
*H01M 4/525* (2010.01)
*H01M 4/02* (2006.01)

(52) U.S. Cl.
CPC ........... *H01M 4/505* (2013.01); *H01M 4/525* (2013.01); *C01P 2002/74* (2013.01); *H01M 2004/028* (2013.01)

(58) Field of Classification Search
CPC ............. H01M 4/525; H01M 2004/028; C01P 2002/74
See application file for complete search history.

(56) References Cited

U.S. PATENT DOCUMENTS

| | | |
|---|---|---|
| 2009/0057137 A1 | 3/2009 | Pitts et al. |
| 2010/0209771 A1 | 8/2010 | Shizuka et al. |
| 2012/0276446 A1 | 11/2012 | Kawai |
| 2012/0321911 A1 | 12/2012 | Watanabe et al. |
| 2013/0309580 A1 | 11/2013 | Tomura |
| 2014/0329146 A1 | 11/2014 | Niina et al. |
| 2015/0021518 A1 | 1/2015 | Kokado et al. |
| 2015/0171424 A1 | 6/2015 | Kawai |
| 2015/0228974 A1 | 8/2015 | Kokado et al. |
| 2017/0054147 A1 | 2/2017 | Yokoyama et al. |
| 2017/0098821 A1 | 4/2017 | Kokado et al. |
| 2017/0141384 A1 | 5/2017 | Kawakita et al. |
| 2017/0187035 A1 | 6/2017 | Yanagihara et al. |
| 2017/0352885 A1* | 12/2017 | Kondo .................. H01M 4/628 |
| 2018/0248195 A1* | 8/2018 | Choi ..................... H01M 4/505 |
| 2018/0287143 A1 | 10/2018 | Ozaki et al. |
| 2018/0287144 A1 | 10/2018 | Furuichi et al. |

FOREIGN PATENT DOCUMENTS

| | | |
|---|---|---|
| CN | 103988349 | 8/2014 |
| EP | 3024068 | 5/2016 |
| EP | 3288104 | 2/2018 |
| JP | H11-016566 | 1/1999 |
| JP | 2005-251716 | 9/2005 |
| JP | 2009-289726 | 12/2009 |
| JP | 2010-040383 | 2/2010 |
| JP | 2010-244847 | 10/2010 |
| JP | 2013-125732 | 6/2013 |
| JP | 2013-152866 | 8/2013 |
| JP | 2013-171785 | 9/2013 |
| JP | 2015-005398 | 1/2015 |
| JP | 2015-133318 | 7/2015 |
| JP | 2015-144108 | 8/2015 |
| JP | 2016-033901 | 3/2016 |
| JP | 2016-110999 | 6/2016 |
| JP | 2016-111000 | 6/2016 |
| JP | 2016127004 A * | 7/2016 ............. C01G 53/00 |
| JP | 2017-062997 | 3/2017 |
| JP | 2017-063015 | 3/2017 |
| WO | 2009/029111 | 3/2009 |
| WO | 2012/043783 | 4/2012 |
| WO | 2012/105048 | 8/2012 |
| WO | 2013/015069 | 1/2013 |
| WO | 2013/024739 | 2/2013 |
| WO | 2015/008582 | 1/2015 |
| WO | 2015/163273 | 10/2015 |
| WO | 2016/031147 | 3/2016 |
| WO | 2016/171081 | 10/2016 |

OTHER PUBLICATIONS

International Search Report dated Feb. 23, 2016 issued with respect to the related International Application No. PCT/JP2015/083367.
Office Action dated Feb. 5, 2018 issued with respect to the related Chinese Patent Application No. 201580075135.7.
Office Action dated Nov. 29, 2019 issued with respect to the related U.S. Appl. No. 15/531,616.
Internatinational Search Report dated Jan. 17, 2017 issued with respect to the related International Application No. PCT/JP2016/081911.
International Preliminary Report on Patentability (Form PCT/IB/373) dated May 1, 2018 issued with respect to the related International Application No. PCT/JP2016/081911.
Office Action dated Apr. 2, 2020 issued with respect to the related U.S. Appl. No. 15/771,208.
Office Action dated Oct. 9, 2020 issued with respect to the related U.S. Appl. No. 15/771,208.

* cited by examiner

POSITIVE ELECTRODE ACTIVE MATERIAL FOR NON-AQUEOUS ELECTROLYTE SECONDARY BATTERY

FIELD OF THE INVENTION

The present invention relates to a positive electrode active material for a non-aqueous electrolyte secondary battery.

BACKGROUND OF THE INVENTION

In recent years, with the spread of portable electronic devices such as mobile phones and notebook computers, development of small and lightweight non-aqueous electrolyte secondary batteries having high energy density has been strongly demanded. Further, development of a high output non-aqueous electrolyte secondary battery as a battery for electric vehicles such as a hybrid vehicle is strongly demanded.

A lithium ion secondary battery as a non-aqueous electrolyte secondary battery is exemplified so as to satisfy such requirements. A lithium ion secondary battery is formed of a negative electrode, a positive electrode, an electrolytic solution and the like. Materials capable of de-intercalating and intercalating lithium ions are used as active materials of negative electrodes and positive electrodes.

Research and development of lithium ion secondary batteries are currently being actively conducted. Among them, a high voltage of 4-Voltage class can be obtained in a lithium ion secondary battery using a layered or spinel type lithium metal composite oxide as a positive electrode active material. Therefore, a practical application of lithium ion secondary battery as a battery having a high energy density has been progressed.

In positive electrode active materials that have been mainly proposed so far, a lithium-cobalt composite oxide ($LiCoO_2$) that is relatively easy to synthesize, a lithium-nickel composite oxide ($LiNiO_2$) that uses nickel cheaper than cobalt, lithium-nickel-cobalt-manganese composite oxide ($LiNi_{1/3}Co_{1/3}Mn_{1/3}O_2$) and lithium manganese composite oxide using manganese ($LiMn_2O_4$) are exemplified.

Of these, lithium-nickel composite oxides have received attention as materials that can provide high battery capacity. Further, in recent years, low resistance required for high output has been regarded as important. The addition of heteroelements has been proposed as a method of achieving the above-mentioned resistance reduction, and transition metals, such as W, Mo, Nb, Ta and Re, that are high valence, have been known as particularly useful.

Further, in recent years, higher output has been demanded, and various studies have been made.

For example, Patent Document 1 discloses a positive electrode for a non-aqueous electrolyte secondary battery including a lithium metal composite oxide formed of primary particles represented by a general formula: $Li_zNi_{1-x-y}Co_xM_yO_2$ (wherein $0.10 \leq x \leq 0.35$, $0 \leq y \leq 0.35$, $0.97 \leq z \leq 1.20$, M is at least one element selected from Mn, V, Mg, Mo, Nb, Ti and Al) and secondary particles formed by aggregating the primary particles, and the lithium metal composite oxide contains fine particles having lithium tungstate represented by any one of $Li_2WO_4$, $Li_4WO_5$, and $Li_6W_2O_9$ on the surface of the lithium metal composite oxide.

RELATED-ART DOCUMENT

Patent Documents

Patent document 1: Japanese Unexamined Patent Publication No. 2013-125732

SUMMARY OF THE INVENTION

Problems to be Solved by the Invention

However, in recent years, non-aqueous electrolyte secondary batteries have been demanded to have further improved performance. Therefore, as for the positive electrode active material for a non-aqueous electrolyte secondary battery, materials that can improve their performance when used in a non-aqueous electrolyte secondary battery have been demanded. Specifically, when used in a non-aqueous electrolyte secondary battery, a positive electrode active material for a non-aqueous electrolyte secondary battery has been demanded so as to increase the discharge capacity and improve the durability by suppressing the positive electrode resistance.

Therefore, in view of the problems of the above-described conventional technology, one aspect of the present invention provides an active material for a non-aqueous electrolyte secondary battery which increases the discharge capacity and improves the durability by suppressing the positive electrode resistance when a non-aqueous electrolyte secondary battery is used.

Means for Solving the Problems

According to an aspect of the present invention for solving the above problems, a positive electrode active material for a non-aqueous electrolyte secondary battery includes a lithium metal composite oxide powder represented by a general formula:

$Li_zNi_{1-x-y}Co_xM_yO_{2+\alpha}$, wherein $0<x\leq0.35$, $0\leq y\leq0.35$, $0.95\leq z\leq1.30$, $-0.15\leq\alpha\leq0.15$, and M is at least one element selected from Mn, V, Mg, Mo, Nb, Ti and Al; and a coating layer placed on particle surfaces of the lithium metal composite oxide powder; wherein the coating layer is a mixed-phase of a crystalline phase and an amorphous phase.

Effects of the Invention

According to one aspect of the present invention, the present invention is capable of providing an active material for a non-aqueous electrolyte secondary battery which increases the discharge capacity and improves the durability by suppressing the positive electrode resistance when a non-aqueous electrolyte secondary battery is used.

DETAILED DESCRIPTION

Hereinafter, embodiments for carrying out the present invention will be described with reference to the drawings, but the present invention is not limited to the following embodiments, and the following embodiments without departing from the scope of the present invention can be variously modified and replaced.

(1) Positive Electrode Active Material for Non-Aqueous Electrolyte Secondary Battery A configuration example of the positive electrode active material for the non-aqueous electrolyte secondary battery of this embodiment will be described below.

The positive electrode active material for a non-aqueous electrolyte secondary battery of the present embodiment (hereinafter, also simply referred to as "positive electrode active material") is capable of containing a lithium metal composite oxide powder and a coating layer placed on the particle surfaces of the lithium metal composite oxide powder. Further, the lithium metal composite oxide powder can be represented by the general formula:

$Li_zNi_{1-x-y}Co_xM_yO_{2+\alpha}$.

Note that x, y, z and α in the above formula preferably satisfy 0<x≤0.35, 0.95≤z≤1.30 and −0.15≤α≤0.15. In addition, M is at least one element selected from Mn, V, Mg, Mo, Nb, Ti and Al.

Then, the coating layer can be a mixed-phase of a crystalline phase and an amorphous phase.

(Lithium Metal Composite Oxide Powder)

The lithium metal composite oxide powder contained in the positive electrode active material of the present embodiment can be represented by the above general formula.

The crystal structure of the lithium metal composite oxide may have a layered structure.

The particles of the lithium metal composite oxide powder preferably include primary particles and secondary particles formed by aggregating the primary particles so that such configuration increases the contact area with the electrolytic solution and is preferable in improving output characteristics.

In order to obtain a higher charge and discharge capacity, the formula of the above preferably satisfies x+y≤0.2 and 0.95≤z≤1.10. When high thermal stability is required, the formula preferably satisfies x+y>0.2.

(Coating Layer)

The positive electrode active material of the present embodiment can have a coating layer (covered layer) on the surface of the particles of the lithium metal composite oxide powder.

In addition, as described above, the particles of the lithium metal composite oxide powder preferably have a form including primary particles and secondary particles formed by aggregating the primary particles. In this case, the coating layer is preferably placed on the surface of the primary particles constituting the surface of the secondary particles and on the surface of the primary particles existing inside the secondary particles, in the particles of the lithium metal composite oxide powder.

The component contained in the coating layer is not particularly limited, but it is preferable to contain a component having high lithium ion conductivity and having an effect of promoting movement of lithium ions. Therefore, the coating layer preferably contains, for example, lithium tungstate. The coating layer may be formed from lithium tungstate.

In general, when the surface of the positive electrode active material is completely covered with a different compound, it is considered that the movement (intercalation) of lithium ions is greatly restricted.

However, for example, when the coating layer has a component having high lithium ion conductivity and having an effect of promoting the movement of lithium ions, a conductive path for the lithium at the interface with an electrolytic solution can be formed by placing the coating layer on the surface of the primary particles of the lithium metal composite oxide powder. Then, the output characteristics of the battery can be improved by suppressing the positive electrode resistance.

Since the positive electrode resistance is reduced, the voltage lost in the battery is reduced, and the voltage actually applied to the load side becomes relatively high, so that a high output can be obtained. Further, since the voltage applied to the load side becomes high, intercalation and de-intercalation of lithium in the positive electrode is sufficiently carried out. As a result, the charge and discharge capacity of the battery, that is, the battery capacity can be improved.

As described above, the coating layer preferably contains a component having high lithium ion conductivity and having an effect of promoting the movement of lithium ions, and for example, lithium tungstate is preferably contained.

Lithium tungstate has many compound forms such as $Li_2WO_4$, $Li_4WO_5$, and $Li_6W_2O_9$, and lithium tungstate in any state may be contained in the coating layer. However, since $Li_2WO_4$ has a high lithium ion conductivity and is less likely to be dissociated by a solvent such as water as compared with other lithium tungstates, the coating layer preferably contains $Li_2WO_4$. In particular, by increasing the content ratio of $Li_2WO_4$ in the coating layer, the positive electrode resistance of the positive electrode active material can be further reduced, and a greater effect of improving the output characteristics can be obtained. In addition, the reduction of the positive electrode resistance also enables to improve the battery capacity. Furthermore, by increasing the content ratio of $Li_2WO_4$ contained in lithium tungstate of the coating layer, the amount of gas generated during high temperature storage of the battery can be suppressed, and the safety thereof can be improved.

Therefore, the lithium tungstate in the coating layer preferably has a high $Li_2WO_4$ content, and the content ratio of $Li_2WO_4$ in the lithium tungstate in the coating layer is, for example, preferably higher than 50% by mol.

The upper limit of $Li_2WO_4$ content in lithium tungstate of the coating layer is not particularly limited, but is preferably 90% by mol or less and more preferably 80% by mol or less. This is because, for example, the presence of a small amount of $Li_4WO_5$ having high lithium ion conductivity and having a positive electrode resistance reduction effect larger than that of $Li_2WO_4$ can further reduce the positive electrode resistance, and such a configuration is preferable.

The compound form of lithium tungstate contained in the coating layer can be evaluated by instrumental analysis using, for example, an X-ray or an electron beam. It can also be evaluated by pH titration analysis with hydrochloric acid.

The contact between the electrolytic solution and the positive electrode active material occurs on the surface of the primary particles of the lithium metal composite oxide contained in the positive electrode active material. Therefore, the coating layer is preferably placed on the surface of the primary particles of the lithium metal composite oxide. Here, the primary particle surface refers to the surface of the primary particle which is exposed to the outer surface of the secondary particles. Further, the primary particle surface also refers to the surface of the primary particles which is exposed near the surface of secondary particles or at internal voids thereof which the electrolytic solution can permeate and contact through the outside of the secondary particles. Further, the surface of the primary particles existing alone is also included in the surface of primary particles. In addition, if the binding of primary particles is incomplete and the electrolyte is permeable even at the grain boundaries between primary particles, the surface of the primary particles is included.

The contact between the positive electrode active material and the electrolytic solution is performed not only on the outer surface of the secondary particles formed by aggregating the primary particles of the lithium metal composite oxide contained in the positive electrode active material, but also near the surface of the secondary particles as well as in voids among the primary particles and incomplete grain boundaries. Therefore, it is preferable to place a coating layer on the surface of the primary particles of the lithium metal composite oxide powder to promote the movement of lithium ions. Thus, by placing the coating layer also on many of the primary particle surfaces of the lithium metal composite oxide powder that can be contacted with the electrolytic solution, the positive electrode resistance of the positive electrode active material can be further reduced. Therefore, such a configuration is preferably applied.

The component contained in the coating layer, for example, a form of lithium tungstate is not particularly limited. The form may be a particle form or a thin film form.

When the component contained in the coating layer has a particle form, the particles contained in the coating layer are preferably particles having a particle size of, for example, 1 nm or more and 400 nm or less. This is because when the particle size of the particles contained in the coating layer is 1 nm or more, sufficient lithium ion conductivity can be exhibited. Further, when the particle size of the particles contained in the coating layer is 400 nm or less, the coating layer can be formed particularly uniformly on the surface of the particles of the lithium metal composite oxide powder, and the positive electrode resistance can be particularly suppressed.

All particles contained in the coating layer do not need to have a particle size distribution of 1 nm or more and 400 nm or less. For example, 50% or more of the number of particles placed on the surface of the particles of the lithium metal composite oxide powder are preferably 1 nm or more and 400 nm or less.

The particles contained in the coating layer do not need to be placed on the entire surface of the particles of the lithium metal composite oxide powder, and may be scattered.

Further, the component contained in the coating layer may be present on the surface of the particles of the lithium metal composite oxide powder in a thin film form as described above. By covering the surface of the lithium metal composite oxide powder with a thin film, it is possible to form a conductive path for lithium at the interface with the electrolyte while suppressing the decrease in specific surface area. Further, it is possible to obtain effects such that the battery capacity can be enhanced and the positive electrode resistance can be reduced.

When the components contained in the coating layer are placed on the surface of the particles of the lithium metal composite oxide powder in a thin film form, the thin film preferably has a film thickness of 1 nm or more and 150 nm or less.

This is because when the components contained in the coating layer are present in a thin film form, the thin film can exhibit sufficient lithium ion conductivity by adjusting the film thickness to 1 nm or more and 150 nm or less.

Even when the component contained in the coating layer exists in a thin film form, the film does not need to be placed on the entire surface of the particles of lithium metal composite oxide powder. For example, the film may be present only partially. Further, the entire thin film does not have to have a film thickness of 1 nm or more and 150 nm or less, and for example, a part of the thin film may have the above film thickness.

The coating layer may have many forms, for example, a mixed state such as the above-mentioned particle form and a thin film form.

The coating layer is preferably a mixed-phase of crystalline phase and amorphous phase. This is because when the coating layer is in an amorphous phase, the conductivity of lithium ions is higher and a reducing effect of the positive electrode resistance is greater. On the other hand, the chemical stability of the coating layer in the battery is considered to be higher in the crystalline phase.

The coating layer is to be a mixed-phase of a crystalline phase and an amorphous phase. By selecting the suitable condition of the mixed-phase of the crystalline phase and the amorphous phase, taking into consideration the constitutional state of the particles forming the lithium metal composite oxide powder as a positive electrode active material, a battery which is capable of ensuring high lithium ion conductivity and ensuring chemical stability in the battery, and capable of providing a battery with long cycle use, can be obtained.

The coating layer included in the positive electrode active material of the present embodiment is preferably a mixed-phase of a crystalline phase and an amorphous phase as described above. The mixing ratio is not particularly limited, but the amorphous phase/crystalline phase ratio of the coating layer, which is determined by the method of evaluating the crystal state of the coating layer described below, is preferably 0.05 or more and 100 or less.

(Evaluation Method of Crystal State of Coating Layer)

For the coating layer placed on the surface of the particles, a method of appropriately evaluating the crystal state of the coating layer with respect to the presence or absence of crystalline phase and amorphous phase in the coating layer has not been found so far.

Therefore, the inventors of the present invention have earnestly studied a method of evaluating the crystal state of a coating layer, which can appropriately evaluate the crystal state of the coating layer placed on the particle surface. As a result, the crystal state of the coating layer placed on the surface of the particles can be evaluated by a Transmission Electron Microscope-Electron Diffraction method, (hereinafter also simply referred to as "TEM-ED method").

When the electron diffraction pattern of a sample containing a crystalline phase or an amorphous phase is measured by the TEM-ED method, a diffraction pattern having a diffraction spot according to the symmetry of the crystal is obtained if the crystalline phase is a single crystal. If the crystalline phase is polycrystal, crystals in all orientations exist in the measurement region, so that a ring-shaped diffraction pattern called a Debye-Scherrer ring appears. Further, no clear diffraction spot appears in the amorphous phase, and a concentric diffraction pattern called a halo pattern is obtained.

Therefore, it can be judged that the coating layer is a mixed-phase of a crystalline phase and an amorphous phase, if the electron diffraction pattern of the obtained coating layer contains a diffraction pattern derived from the crystalline phase and a diffraction pattern derived from the amorphous phase when the TEM-ED method is used aimed at and measuring the coating layer formed on the surface of the particles.

Further, the present inventors found that an index of the ratio of the crystalline phase and the amorphous phase can be obtained by image analysis of the electron diffraction pattern obtained by the TEM-ED method and by using the integral value of the diffraction intensity derived from the crystalline phase and the integral value of the diffraction intensity derived from the amorphous phase.

Analyzing images of the electron diffraction pattern referred to here is that the brightness value is extracted as the diffraction intensity from the electron diffraction pattern. In addition, unless otherwise specified, the diffraction intensity in the TEM-ED method refers to a brightness value (gray value).

Therefore, the method of evaluating the crystal state of the coating layer can include the following steps.

An electron diffraction pattern acquisition step in which an electron diffraction pattern of the coating layer is acquired using a transmission electron microscope-electron diffraction pattern;

a diffraction intensity calculation step wherein a diffraction intensity pattern in a one-dimensional region is extracted from the acquired electron diffraction pattern, and an integral value Ic of a diffraction intensity of a crystalline phase region derived from a (lmn) plane which is a crystalline plane having a highest diffraction intensity of a crystalline phase contained in the coating layer and an integral value Ia of a diffraction intensity of an amorphous phase region derived from an amorphous phase contained in the coating layer are calculated from the acquired diffraction intensity pattern;

a normalization step in which a normalized integral value Ics is calculated by dividing the integral value Ic by a ratio of a diffraction intensity of the (lmn) plane when a diffraction intensity of a crystalline plane having a highest diffraction intensity in a powder X-ray diffraction pattern of the crystalline phase is regarded as 1; and a ratio calculation step in which a ratio of the integral value Ia and the normalized integral value Ics is calculated to obtain an amorphous-phase/crystalline-phase ratio of the coating layer.

Hereinafter, each step will be described.

(Electron Diffraction Pattern Acquisition Step)

In the electron diffraction pattern acquisition step, the electron diffraction pattern of the coating layer can be acquired using a transmission electron microscope-electron diffraction method.

The measurement conditions for obtaining the electron diffraction pattern are not particularly limited, and can be arbitrarily selected according to the sample to be measured and the like. For example, it is preferable to select an accelerating voltage or the like so that sufficient spatial resolution can be obtained and the sample is not decomposed.

The specific configuration of the positive electrode active material having a coating layer for a non-aqueous electrolyte secondary battery is not particularly limited, but the particles serving as the base material may preferably include particles of the lithium metal composite oxide powder as described above. Further, the coating layer preferably contains lithium tungstate.

Regarding a positive electrode active material having a coating layer containing lithium tungstate for a non-aqueous electrolyte secondary battery, for example, the acceleration voltage of the transmission electron microscope is preferably adjusted to 60 kV or higher and 300 kV or lower when obtaining the electron diffraction pattern of the coating layer in the electron diffraction pattern acquisition step.

This is because by adjusting the acceleration voltage to 60 kV or higher, the spatial resolution can be increased and the fine region can be accurately evaluated. Also, by adjusting the acceleration voltage to 300 kV or lower, it is possible to suppress damage to the sample.

The probe current value is not particularly limited as long as the desired diffraction pattern is obtained.

The measurement conditions have been described with reference to the case where the measurement target is a positive electrode active material having a coating layer containing lithium tungstate for a non-aqueous electrolyte secondary battery. The same acceleration voltage may be applied for other than the above case.

(Diffraction Intensity Calculation Step)

In the diffraction intensity calculation step, a diffraction intensity pattern in a one-dimensional region is extracted from the acquired electron diffraction pattern. An integral value Ic of the diffraction intensity of the crystalline phase region derived from a (lmn) plane which is the crystalline plane having the highest diffraction intensity of the crystalline phase contained in the coating layer and an integral value Ia of the diffraction intensity of the amorphous phase region derived from the amorphous phase contained in the coating layer are calculated.

In the diffraction intensity calculation step, first, the diffraction intensity pattern of the one-dimensional region can be extracted from the electron diffraction pattern. That is, it is possible to obtain the diffraction intensity pattern by extracting the brightness value of the one-dimensional region from the electron diffraction pattern.

Figure 1:
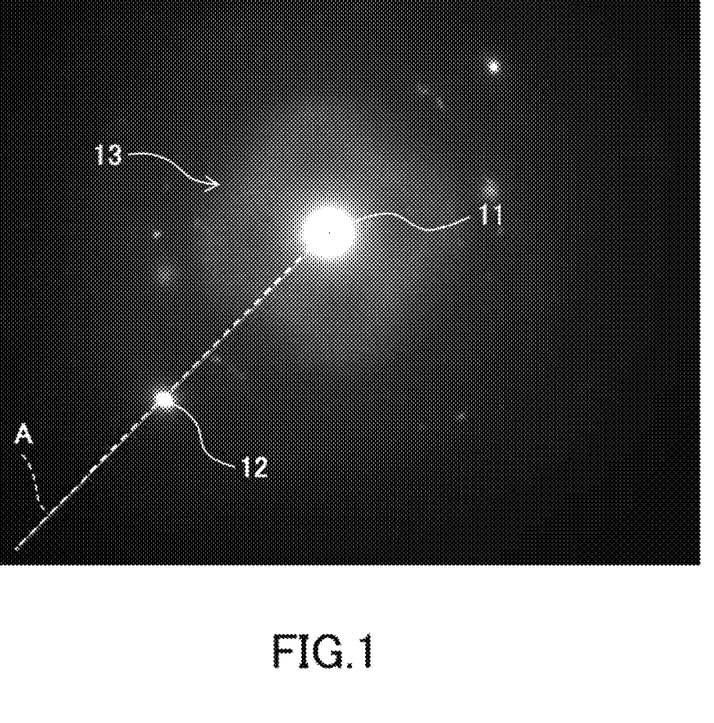
FIG. 1 is an electron diffraction pattern of a coating layer of a positive electrode active material produced in Example 1.

By the TEM-ED method, for example, the two-dimensional electron diffraction pattern shown in FIG. 1 can be obtained. Then, in the electron diffraction pattern, the brightness values of the one-dimensional area A indicated by, for example, a dotted line are extracted along the radial direction, with the origin being the center of the zero-loss peak 11 which is a peak made by electrons transmitted without energy loss, and then the diffraction intensity pattern can be acquired.

At this time, the one-dimensional area A is set so as to pass through the diffraction spot 12 derived from the (lmn) plane (l, m and n are integers) having the highest diffraction intensity, that is the highest brightness, shown in the electron diffraction pattern.

In the diffraction intensity calculation step, the composition, crystal structure or index are not particularly limited as long as the diffraction spot derived from the crystalline phase used when setting the one-dimensional region A to acquire the diffraction intensity pattern is contained in a coated film and assigned to the components subject to evaluation. Further, either a diffraction spot derived from a single crystal or a diffraction spot derived from a polycrystal may be used. When a plurality of diffraction patterns having different crystal orientations appear in the electron diffraction pattern, it is preferable to use the diffraction spot having the highest diffraction intensity, that is, good crystallinity, as described above. A powder X-ray diffraction database such as ICDD (registered trademark) can be used for assigning the diffraction pattern derived from the crystalline phase.

Figure 2:
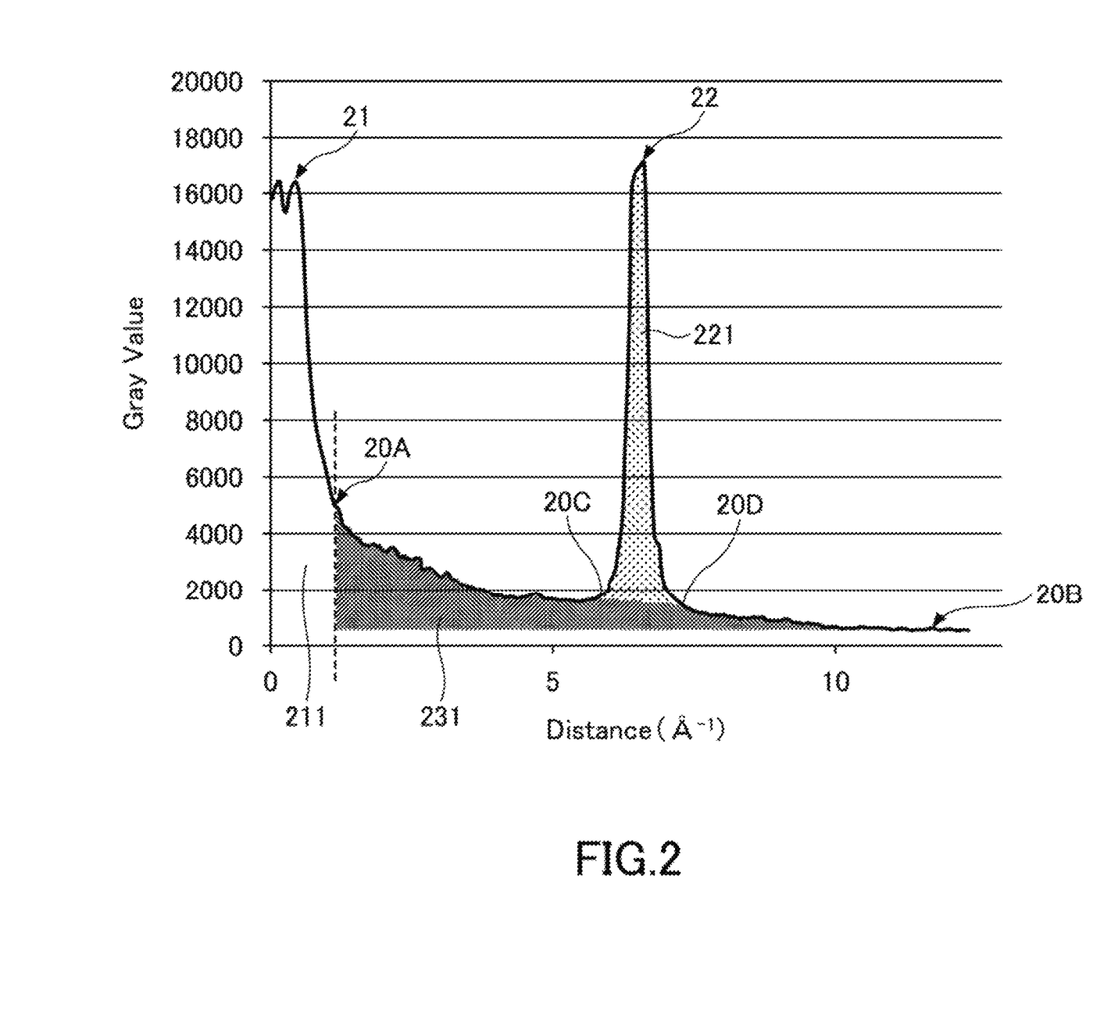
FIG. 2 is a diagram showing a diffraction intensity pattern extracted from the electron diffraction pattern shown in FIG. 1.

Here, FIG. 2 shows an example in which the diffraction intensity pattern of the one-dimensional area A shown in FIG. 1 is extracted. In FIG. 2, the vertical axis represents the diffraction intensity, the horizontal axis represents the distance from the origin in the reciprocal lattice space, and the unit is the reciprocal of A. The diffraction intensity pattern is obtained by extracting the diffraction intensity pattern of the one-dimensional region A along the radial direction with the origin being the center of the zero-loss peak 11 in FIG. 1.

As shown in FIG. 2, the diffraction intensity pattern has a zero-loss peak 21 on the origin side and a peak 22 derived from the (lmn) plane in which the crystalline phase has the highest diffraction intensity.

Then, from the diffraction intensity pattern, the integral value Ic of the diffraction intensity of the crystalline phase region derived from the (lmn) plane, which is the crystalline plane having the highest diffraction intensity of the crystalline phase contained in the coating layer and the integral value Ia of the diffraction intensity of the amorphous phase region derived from the amorphous phase contained in the coating layer are calculated from the obtained diffraction intensity pattern.

The specific procedure for calculating the integral value Ic and the integral value Ia is not particularly limited. However, for example, it is preferable to exclude the region of the zero-loss peak derived from the zero-loss peak, then separate the crystalline phase region derived from the crystalline phase and the amorphous phase region, and calculate the respective integral values.

There is no particular limitation on how to define the zero-loss peak area. However, for example, the end point of the region of the zero-loss peak can be an inflection point that appears between the region of the zero-loss peak and another region. That is, in FIG. 2, the inflection point 20A generated between the region 211 of the zero-loss peak 21 and the other region, that is, the amorphous phase region 231, may be the end point of the region 211 of the zero-loss peak 21.

As a concrete method of determining the inflection point, for example, the differential value of the diffraction intensity pattern is calculated by using the Savitzky-Golay method for simultaneously smoothing and differentiating the measured values, and it is possible to use a method that takes the point corresponding to the absolute value of the differential value becoming 10% of the maximum value in the zero-loss peak region as an inflection point. Further, the smoothing and differentiating method for the diffraction intensity pattern is not limited to the Savitzky-Golay method, and various methods can be appropriately used.

The method of selecting the end point of the amorphous phase region 231 when calculating the integral value Ia of the diffraction intensity of the amorphous phase region 231 is not particularly limited. However, for example, the point 20B at which the diffraction intensity decreases to the background can be the end point of the amorphous phase region 231.

The background can be defined as the value of the diffraction intensity at the point where the distance from the center of the zero-loss peak in the reciprocal lattice space is 12 $Å^{-1}$. Here, the region where the distance in the reciprocal lattice space from the center of the zero-loss peak is larger than 12 $Å^{-1}$ corresponds to the region where the lattice plane spacing is less than about 0.083 Å in the real space. Since the lattice plane spacing is a value sufficiently small with respect to the interatomic distance of the substance forming the coating layer, the diffraction intensity in this region can be ignored.

Further, for example, the start point of the amorphous phase region 231 or 1/10 of the diffraction intensity of the end point of the region 211 of the zero-loss peak 21 can be defined as the background.

Then, the area between the end point of the area 211 of the zero-loss peak 21 in the diffraction intensity pattern and the point 20B at which the diffraction intensity decreases to the background can be set as the integration area when the integral value Ia is calculated.

Further, as shown in FIG. 2, when the crystalline phase region 221 and the amorphous phase region 231 partially overlap in the diffraction intensity pattern, the crystalline phase region 221 and the amorphous phase region 231 are defined as follows.

The point 20C of the diffraction intensity of the amorphous phase region 231 at the position where the crystalline phase region 221 and the amorphous phase region 231 start overlapping and the point 20D of the diffraction intensity of the amorphous phase region 231 at the position where the crystalline phase region 221 and the amorphous phase region 231 end overlapping are connected to form a line. The area in which the diffraction intensity is smaller than the above line is considered as an amorphous phase region 231.

Further, a region having a higher diffraction intensity than the points 20C and 20D can be set as the crystalline phase region 221.

(Normalization Step)

In a normalization step, a normalized integral value Ics is calculated by dividing the integral value Ic by the ratio of the diffraction intensity of the (lmn) plane, when the diffraction intensity of the crystalline plane having the highest diffraction intensity in the powder X-ray diffraction pattern of the crystalline phase is regarded as 1.

The brightness of the diffraction spot derived from the crystalline phase changes according to its index. As a result, the diffraction intensity in the diffraction intensity pattern changes. This is because the atomic density differs depending on the index.

When acquiring the electron diffraction pattern by the TEM-ED method, the plane index of the diffraction spot appearing as the highest brightness in the obtained electron diffraction pattern may differ depending on the positions of the sample surface and the electron gun.

Therefore, with respect to the diffraction intensity derived from the crystalline phase used for calculating the integral value, it is necessary to weight the diffraction intensity for each index. The inventors of the present invention have found that this weighting is performed using the diffraction intensity ratio in the powder X-ray diffraction pattern of the crystalline phase.

In the normalization step, a normalized integral value Ics is calculated by dividing the integral value Ic by the ratio of the diffraction intensity of the (lmn) plane, when the diffraction intensity of the crystalline plane having the highest diffraction intensity in the powder X-ray diffraction pattern of the crystalline phase is regarded as 1, as described above.

The (lmn) plane is the plane included in the diffraction intensity pattern used when calculating the integral value Ic in the diffraction intensity calculation step. In the powder X-ray diffraction pattern, the crystalline plane having the highest diffraction intensity and the (lmn) plane may be the same plane. In this case, the numerical value by which the integral value Ic is divided is 1, and the integral value Ic and the normalized integral value Ics become the same numerical value.

The powder X-ray diffraction pattern of the crystalline phase used when carrying out the normalization step can be obtained experimentally, but it is preferable to use the data in the database of the powder X-ray diffraction pattern. For example, data described in ICDD can be used.

A calculation example of the normalization step will be described below by exemplifying the case where the coating layer contains $Li_2WO_4$. It is assumed that the diffraction intensity peak derived from the diffraction spot derived from the (220) plane of $Li_2WO_4$ (ICDD No. 00-01-0760) was used in calculating the integral value Ic in the diffraction intensity calculation step. In this case, according to the description of ICDD, the diffraction intensity derived from the (220) plane is 0.25 when the diffraction intensity derived from the (211) plane, which has the highest diffraction intensity in $Li_2WO_4$, is regarded as 1. The integral value is weighted by dividing the integral value Ic by 0.25. By this operation, the normalized integral value Ics of the diffraction intensity derived from the crystalline phase (lmn) plane can be calculated.

(Ratio Calculation Step)

In the ratio calculation step, the ratio of the integral value Ia and the normalized integral value Ics can be calculated to obtain the ratio of amorphous phase/crystalline phase of the coating layer.

The ratio of amorphous phase/crystalline phase is an index of the ratio of the amorphous phase and the crystalline phase contained in the coating layer. For example, regarding the particles having the coating layer, it becomes possible to compare the ratio for the amorphous phase with the crystalline phase, contained in the coating layer. Therefore, according to the above-described method of evaluating the crystal state of the coating layer, it becomes possible to appropriately evaluate the ratio of the crystalline phase and the amorphous phase in the coating layer.

When the positive electrode active material for a non-aqueous electrolyte secondary battery of the present embodiment is evaluated by the crystal state evaluation method for the coating layer described so far, the amorphous phase/crystalline phase ratio, which is the ratio of the integral value Ia of the coating layer to the normalized integral value Ics, is preferably 0.05 or more and 100 or less.

This refers that the coating layer contains a sufficient amorphous phase by setting the ratio of the amorphous phase/crystalline phase in the coating layer to 0.05 or more, and the positive electrode resistance can be suppressed. On the other hand, by adjusting the ratio of the amorphous phase/crystalline phase in the coating layer to 100 or less, the coating layer contains a sufficient crystalline phase, durability, that is, cycle characteristics, can be improved.

(2) Method of Producing Positive Electrode Active Material for Non-Aqueous Electrolyte Secondary Battery Next, a method of producing the positive electrode active material for a non-aqueous electrolyte secondary battery of the present embodiment (hereinafter, also referred to as "method of producing positive electrode active material") will be described. According to the method of producing a positive electrode active material for a non-aqueous electrolyte secondary battery of the present embodiment, the positive electrode active material for a non-aqueous electrolyte secondary battery described above can be produced. Therefore, description of some of the items already described will be omitted.

The method of producing the positive electrode active material of the present embodiment can include, for example, the following steps.

A step of washing with water to wash a powder of the lithium metal composite oxide represented by the general formula:

$Li_zNi_{1-x-y}Co_xM_yO_{2+\alpha}$, and then to perform solid-liquid separation by washing with water to obtain a lithium metal composite oxide cake.

Note that x, y, z and a in the above general formula preferably satisfy $0<x\leq0.35$, $0\leq y\leq0.35$, $0.95\leq z\leq1.30$ and $-0.15\leq\alpha\leq0.15$. Further, M can be at least one element selected from Mn, V, Mg, Mo, Nb, Ti and Al.

A mixing step of mixing the lithium metal composite oxide cake with a compound of a metal element forming a coating layer, or a mixture of a compound of a metal element forming a coating layer and a lithium compound to prepare a raw material mixture.

A heat treatment step of heat treating the raw material mixture.

Hereinafter, each step will be described.

(Washing Step)

In the lithium metal composite oxide powder obtained by firing a lithium mixture of a metal composite hydroxide or metal composite oxide as a precursor and a lithium compound, unreacted lithium compound is present on the surface of the secondary particles or the primary particles thereof. Therefore, in order to remove excess lithium, it is possible to have a water washing step of washing the lithium metal composite oxide powder with water.

The metal composite oxide is represented by, for example, $Ni_{1-x-y}Co_xM_yO_{1+\beta}$. The metal composite hydroxide is represented by, for example, $Ni_{1-x-y}Co_xM_y(OH)_{2+\gamma}$. Since x, y and the element M in the formula are the same as in the case of the above-mentioned lithium metal composite oxide powder, description thereof is omitted here. The β and γ can be adjusted to $-0.15\leq\beta\leq0.15$ and $-0.15\leq\gamma\leq0.15$.

These metal composite oxides and metal composite hydroxides can be prepared by a crystallization method or the like.

Further, lithium hydroxide or lithium carbonate can be used as the lithium compound. When lithium hydroxide is used as the lithium compound, it is preferable to carry out an anhydrous treatment to obtain lithium hydroxide anhydrate before use.

The firing conditions for the lithium mixture are not particularly limited, and the firing can be performed according to a conventional method.

In the water washing step, for example, the lithium metal composite oxide powder and water are mixed to form a slurry, which can be washed with water. After washing with water, the water content of the obtained lithium metal composite oxide cake can be adjusted by solid-liquid separation.

The washing conditions in the washing step are not particularly limited, but the unreacted lithium compound is sufficiently reduced, for example, the unreacted lithium compound may be preferably reduced to 0.08% by mass or less and more preferably 0.05% by mass or less with respect to the total amount of the lithium metal composite oxide powder. When forming a slurry, it is preferable that the concentration of the lithium metal composite oxide powder contained in the slurry is, for example, 150 g or more and 5000 g or less relative to 1 L of water.

By adjusting the concentration of the lithium metal composite oxide powder in the above range, it is possible to more sufficiently reduce the amount of unreacted lithium compound while suppressing the deterioration due to the elution of lithium from the particles of the lithium metal composite oxide powder.

The washing time and the washing temperature may be set in a range that can sufficiently reduce the unreacted lithium compound. For example, the washing time may be preferably set to 5 minutes to 60 minutes and the washing temperature may be preferably set to 10° C. to 40° C.

The water used in the washing step is not particularly limited. However, it is preferable to use pure water from the viewpoint of preventing deterioration of battery characteristics due to adhesion of impurities to the positive electrode active material. In particular, it is preferable to use pure water having an electric conductivity of less than 10 μS/cm and more preferably 1 μS/cm or less.

After the washing step, solid-liquid separation is performed to obtain a lithium metal composite oxide cake. The method of performing solid-liquid separation is not particularly limited, but it is preferable to perform squeezing by squeezing devices such as a filter press or a belt filter, or suction filtration using a Nutsche or the like.

(Mixing Step)

In the mixing step, the raw material mixture is prepared by mixing the lithium metal composite oxide cake and a compound of the metal element forming the coating layer, or a mixture of the compound of the metal element forming the coating layer and a lithium compound.

Since the compound of the metal element forming the coating layer permeates to the surface of the primary particles inside the secondary particles of the lithium metal composite oxide, it preferably has water solubility to dissolve in the water contained in the raw material mixture. The compound of the metal element forming the coating layer may be a compound which is difficult to dissolve in water at room temperature, but is soluble in water by heating during heat treatment. Furthermore, since the water content of the raw material mixture becomes alkaline due to the lithium contained, it may be a compound that is soluble in alkaline.

The state of the compound of the metal element forming the coating layer is not particularly limited, and may be, for example, a solid state or an aqueous solution state.

As described above, the compound of the metal element forming the coating layer is not limited as long as it is soluble in water. However, since the coating layer preferably contains lithium tungstate, the compound of the metal element forming the coating layer is preferably, for example, one or more types selected from tungsten oxide, lithium tungstate, ammonium tungstate and sodium tungstate. From the viewpoint of being less likely to contain impurities, the compound of the metal element forming the coating layer is preferably one or more types selected from tungsten oxide, lithium tungstate and ammonium tungstate, and more preferably one or more types selected from tungsten oxide and lithium tungstate.

The Li molar ratio, which is the molar ratio of lithium capable of reacting with the metal element to the metal element forming the coating layer in the raw material mixture obtained in the mixing step, is not particularly limited. However, when the coating layer contains lithium tungstate, the molar ratio is preferably 1.5 or more and less than 3.0. This is because by setting the Li molar ratio of the raw material mixture within the above range, the abundance ratio of $Li_2WO_4$ in the obtained positive electrode active material can be preferably 50% by mol. The lithium capable of reacting with the metal element forming the coating layer refers to, for example, lithium dissolved in water contained in the raw material mixture.

Depending on the tungsten compound added, the molar ratio of Li may be less than 1.5. In that case, a lithium compound may be added to make up for the shortage, and a water-soluble compound such as lithium hydroxide (LiOH) can be preferably used as the lithium compound.

Thereby, the amount of tungsten contained in lithium tungstate in the positive electrode active material can be set within a preferable range, and the high battery capacity and output characteristics of the positive electrode active material can be further compatible.

Although an example in which the water washing step and the mixing step are performed as separate steps is shown here, the present invention is not limited to this. For example, both steps can be performed simultaneously.

(Heat Treatment Step)

The heat treatment step is a step of heat treating the raw material mixture prepared in the mixing step.

As a result, the coating layer is formed, and the positive electrode active material having the coating layer can be obtained.

The heat treatment in the heat treatment step is preferably performed in an oxidizing atmosphere such as an oxygen atmosphere or in a vacuum atmosphere in order to prevent deterioration of electrical characteristics when used as a positive electrode active material, and to avoid reaction with moisture or carbonic acid in the atmosphere.

By controlling the temperature profile in the heat treatment step, it is possible to form a target coating layer in which a crystalline phase and an amorphous phase are mixed.

According to the study by the inventors of the present invention, in the heat treatment step, the integral value of temperature×time in a temperature range higher than 100° C. is controlled to be 20 (° C.·hr) or more and 400 (° C.·hr) or less. It is possible to form a coating layer in which a crystalline phase and an amorphous phase are mixed. It should be noted that only the time of temperature increase and the keeping time at the highest temperature are subject to the integration target of temperature×time, and the integration target of the cooling time is not included.

According to the study by the inventors of the present invention, a crystalline phase can be sufficiently formed in the coating layer by setting the integral value of temperature×time to 20 (° C.·hr) or more. Therefore, when the obtained positive electrode active material is used as a non-aqueous electrolyte secondary battery, cycle characteristics, that is, durability can be improved.

On the other hand, by setting the integral value of temperature×time to 400 (° C.·hr) or less, the abundance ratio of the amorphous phase in the coating layer can be sufficiently increased. Therefore, when the obtained positive electrode active material is used as a non-aqueous electrolyte secondary battery, the positive electrode resistance can be suppressed and the discharge capacity can be increased.

The control of the temperature profile as described above can be controlled by the heating rate and the heat treatment time of the heat treatment step.

The heating rate is not particularly limited, but it is preferable to set the heating rate to, for example, 0.8° C./min or more and 1.2° C./min or less until the temperature exceeds 90° C. This is because the components of the coating layer can be sufficiently dissolved in water and homogenize the components of the coating layer by adjusting the heating rate to 0.8° C./min or more and 1.2° C./min or less.

The heat treatment temperature, that is, the highest temperature is preferably 100° C. or higher and 600° C. or lower. By setting the heat treatment temperature to 100° C. or higher, water can be sufficiently evaporated and the coating layer can be reliably formed. However, when the heat treatment temperature is higher than 600° C., there is a concern that the primary particles of the lithium metal composite oxide are likely to sinter and some of the components of the coating layer are solid-dissolved in the lithium metal composite oxide. Therefore, as described above, the heat treatment temperature is preferably 100° C. or higher and 600° C. or lower.

In addition, although the configuration in which the crystal state of the coating layer is controlled by the temperature profile of the heat treatment step is shown here, the present invention is not limited to such a configuration, and the crystal state required for the coating layer can be controlled by any method.

(3) Non-Aqueous Electrolyte Secondary Battery

The non-aqueous electrolyte secondary battery of the present embodiment is composed of a positive electrode, a negative electrode, a non-aqueous electrolytic solution, and the like, and is similar to a general non-aqueous electrolyte secondary battery except that the positive electrode active material described above is used as the material of the positive electrode. Note that the embodiments described below are merely examples, and the non-aqueous electrolyte secondary battery of the present embodiment is variously changed or modified based on the embodiments described in this specification based on the knowledge of those skilled in the art. The use of the non-aqueous electrolyte secondary battery of the present invention is not particularly limited.

(Positive Electrode)

Using the positive electrode active material described above, for example, a positive electrode can be manufactured as follows.

First, a powdery positive electrode active material, a conductive material, and a binder are mixed to form a positive electrode mixture, and if necessary, activated carbon, a solvent for the purpose of adjusting viscosity or the like are added, and the mixture is kneaded to form a positive electrode mixture paste. The performance of the non-aqueous electrolyte secondary battery can be adjusted by adjusting the respective mixing ratios in the positive electrode mixture paste. When the total mass of the solid content of the positive electrode mixture excluding the solvent is 100 parts by mass, the content of the positive electrode active material is 60 parts by mass or more and 95 parts by mass or less, in the same manner as the positive electrode of a general non-aqueous electrolyte secondary battery. It is preferable that the content of the conductive material is 1 part by mass or more and 20 parts by mass or less, and the content of the binder is 1 part by mass or more and 20 parts by mass or less.

The obtained positive electrode mixture paste is applied, for example, to the surface of a current collector made of aluminum foil and dried to scatter the solvent. If necessary, pressure may be applied by a roll press or the like in order to increase the electrode density. In this way, a sheet-shaped positive electrode can be manufactured. The sheet-shaped positive electrode can be cut into an appropriate size according to the intended battery and used for the production of the battery. However, the method of producing the positive electrode is not limited to the example, and other methods may be used. For example, it can be produced by press-molding a positive electrode mixture or a positive electrode mixture paste and then drying it in a vacuum atmosphere.

In producing the positive electrode, as the conductive agent, for example, graphite (natural graphite, artificial graphite, expanded black, lead or the like) and carbon black materials such as acetylene black and Ketjen black (registered trademark) can be used.

The binder plays a role of binding the active material particles, and for example, polyvinylidene fluoride (PVDF), polytetrafluoroethylene (PTFE), fluororubber, ethylene propylene diene rubber, styrene butadiene, cellulosic resin, polyacryl acid or the like can be used.

If necessary, a solvent that disperse a positive electrode active material, a conductive material, and activated carbon and that dissolves the binder is added to the positive electrode mixture. As the solvent, specifically, an organic solvent such as N-methyl-2-pyrrolidone can be used. Activated carbon may be added to the positive electrode mixture to increase the electric double layer capacity.

(Negative Electrode)

As the negative electrode, a material obtained by applying a negative electrode mixture material to the surface of a metal foil current collector such as copper and drying the material can be used. It should be noted that, if necessary, the electrodes can be compressed to increase the electrode density.

As the negative electrode mixture material, the material which is prepared by mixing a binder to metallic lithium, a lithium alloy or a negative electrode active material capable of absorbing and desorbing lithium ions and by mixing a suitable solvent to form the material in paste form can be used.

As the negative electrode active material, for example, natural graphite, artificial graphite, a fired body of an organic compound such as phenol resin or a powdery body of a carbon material such as coke can be used. In this case, a fluorine-containing resin such as PVDF can be used as the negative electrode binder in the same manner as the positive electrode. As a solvent for dispersing the active material and the binder, organic solvents such as N-methyl-2-pyrrolidone or the like can be used.

(Separator)

A separator is placed between the positive and negative electrodes. The separator separates the positive electrode and the negative electrode and retains the electrolyte. The separator is a thin film of polyethylene, polypropylene or the like, and the film having a large number of minute holes can be used.

(Non-Aqueous Electrolyte)

As the non-aqueous electrolyte, a lithium salt as a supporting salt dissolved in an organic solvent can be used.

Examples of the organic solvent include cyclic carbonates such as ethylene carbonate, propylene carbonate, butylene carbonate, trifluoropropylene carbonate or the like; chain carbonates such as diethyl carbonate, dimethyl carbonate, ethylmethyl carbonate, dipropyl carbonate or the like; ether compounds such as tetrahydrofuran, 2-methyltetrahydrofuran, dimethoxyethane or the like; sulfur compounds such as ethylmethylsulfone and butanesultone; and phosphorus compounds such as triethyl phosphate, trioctyl phosphate or the like. These compounds can be used alone or two or more kinds in a mixture.

As the supporting salt, $LiPF_6$, $LiBF_4$, $LiClO_4$, $LiAsF_6$, $LiN(CF_3SO_2)_2$ or the like and complex salts thereof can be used. Furthermore, the non-aqueous electrolyte solution may contain a radical scavenger, a surfactant, a flame retardant and the like.

Up to this point, the case where a non-aqueous electrolyte solution is used as the non-aqueous electrolyte has been described as an example, but the present invention is not limited to such a form. A solid electrolyte may be used as the non-aqueous electrolyte. The solid electrolyte has the property of withstanding a high voltage. Examples of the solid electrolyte include inorganic solid electrolytes and organic solid electrolytes.

Examples of the inorganic solid electrolyte include oxide-based solid electrolytes and sulfide-based solid electrolytes.

The oxide-based solid electrolyte is not particularly limited, and for example, one containing oxygen (O) and having lithium ion conductivity and electronic insulation can be suitably used. Examples of the oxide-based solid electrolyte include lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2OSiO_2$, $Li_2O$—$B_2O_3$—$ZnO$, $Li_{1+x}Al_xTi_{2-x}(PO_4)_3$ ($0 \leq X \leq 1$), $Li_{1+x}Al_xGe_{2-x}(PO_4)_3$ ($0 \leq X \leq 1$), $LiTi_2(PO_4)_3$, $Li_{3x}La_{2/3-x}TiO_3$ ($0 \leq X \leq \frac{2}{3}$), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$ and the like. One or more types selected from the above can be used.

The sulfide-based solid electrolyte is not particularly limited and, for example, one containing sulfur (S) and having lithium ion conductivity and electronic insulation can be suitably used. Examples of the sulfide-based solid electrolyte include, for example, $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$ and the like. One or more types selected from the above can be used.

As the inorganic solid electrolyte, those other than the above may be used, and for example, $Li_3N$, $LiI$, $Li_3N$—$LiI$—$LiOH$ or the like may be used.

The organic solid electrolyte is not particularly limited as long as it is a polymer compound exhibiting ion conductivity, and for example, polyethylene oxide, polypropylene oxide, copolymers thereof and the like can be used. Further, the organic solid electrolyte may contain a supporting salt (lithium salt).

Incidentally, as described above, the secondary battery of the present embodiment is not limited to the form using the non-aqueous electrolyte solution as the non-aqueous electrolyte. For example, a secondary battery using a solid non-aqueous electrolyte, that is, the battery may be an all-solid-state battery. In the case of an all-solid-state battery, the configuration other than the positive electrode active material can be changed as necessary.

(Battery Shape and Configuration)

The shape of the non-aqueous electrolyte secondary battery of the present embodiment composed of the positive electrode, the negative electrode, the separator and the non-aqueous electrolytic solution described above is not particularly limited, and may be various types such as a cylindrical type, a laminated type or the like.

Regardless of which shape is adopted, the electrode body is obtained by laminating the positive electrode and the negative electrode via the separator. Then, the obtained electrode body is impregnated with a non-aqueous electrolytic solution to collect current between the positive electrode current collector and the positive electrode terminal that communicates with the outside, and between the negative electrode current collector and the negative electrode terminal that communicates with the outside. A non-aqueous electrolyte secondary battery can be obtained by connecting the battery using a lead or the like and sealing the battery case.

(Characteristic)

The non-aqueous electrolyte secondary battery using the above-mentioned positive electrode active material can suppress the positive electrode resistance, increase the discharge capacity, and improve the durability.

The non-aqueous electrolyte secondary battery of the present embodiment using the above-described positive electrode active material, for example, in the case of a 2032 coin-type battery, can obtain a high initial discharge capacity of 165 mAh/g or more and a low positive electrode resistance. Furthermore, high capacity and high output can be obtained. Also, it can also be said that the battery has high thermal stability and is excellent in safety.

Figure 3A:
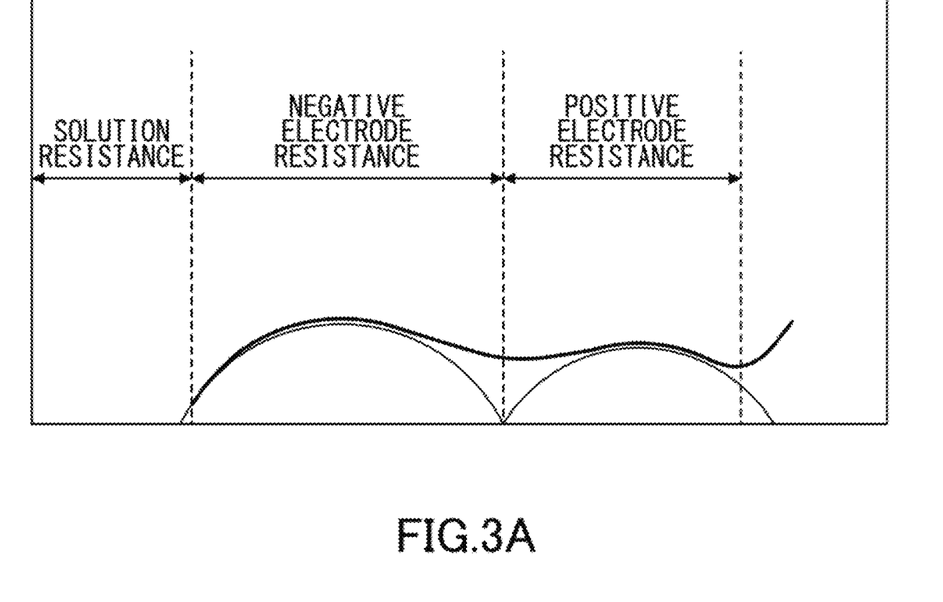
FIG. 3A is a measurement example of impedance evaluation.
Figure 3B:
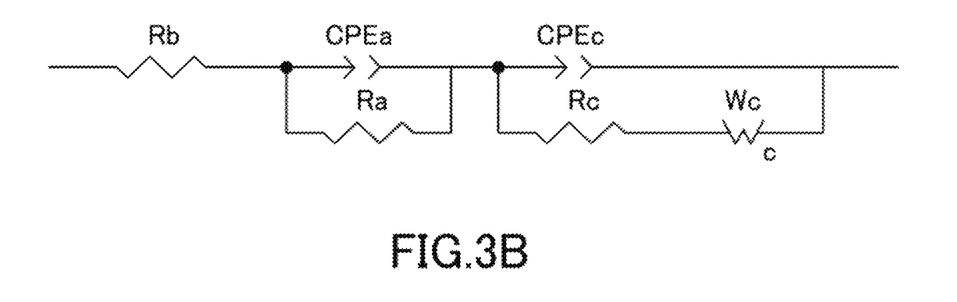
FIG. 3B is a schematic explanatory diagram of an equivalent circuit used for analysis of impedance evaluation results.

In the measuring method of the positive electrode resistance, the Nyquist diagram based on the solution resistance, negative electrode resistance and negative electrode capacity, and positive electrode resistance and positive electrode capacity can be obtained as illustrated in FIG. 3A by measuring the frequency dependency of the battery reaction by a general AC impedance method as a general electrochemical evaluation method. Since the Nyquist diagram is expressed as the sum of the characteristic curves showing the solution resistance, the negative electrode resistance and the capacitance, and the positive electrode resistance and the capacitance, the fitting calculation is performed using the equivalent circuit of FIG. 3B to estimate the value of the positive electrode resistance. The positive electrode resistance is equal to the diameter of the semicircle on the low frequency side of the obtained Nyquist diagram.

From the above, the positive electrode resistance can be estimated by measuring the AC impedance of the produced positive electrode and performing a fitting calculation on the obtained Nyquist diagram with an equivalent circuit.

The non-aqueous electrolyte secondary battery of this embodiment described above includes a positive electrode using the above-described positive electrode active material as a positive electrode material. Therefore, it is possible to obtain a non-aqueous electrolyte secondary battery in which the positive electrode resistance is suppressed, the discharge capacity is increased, and the durability is also increased.

The non-aqueous electrolyte secondary battery of the present embodiment can be suitably used as a power source for a small portable electronic device (such as a notebook personal computer or a mobile phone terminal) that always requires a high capacity, and has high output and durability. It can also be suitably used as a required battery for electric vehicles.

Further, the non-aqueous electrolyte secondary battery of the present embodiment is favorable for a power source for an electric vehicle that is restricted in mounting space, because the non-aqueous electrolyte secondary battery of the present embodiment has excellent safety, can be miniaturized, has high output and has high durability. The non-aqueous electrolyte secondary battery of the present embodiment is not only a power source for an electric vehicle driven purely by electric energy, but also as a power source for a so-called hybrid vehicle used in combination with a combustion engine such as a gasoline engine or a diesel engine.

EXAMPLES

Hereinafter, the present invention will be described more specifically with reference to Examples. However, the present invention is not limited to the following examples.

Non-aqueous electrolyte secondary batteries were prepared using the positive electrode active materials prepared in the following examples and comparative examples, and evaluated. First, a method of producing a non-aqueous electrolyte secondary battery and an evaluation method will be described.

In the following Examples and Comparative Examples, respective samples of Wako Pure Chemical Industries, Ltd. special grade reagent were used for the production of the composite hydroxide, the production of the positive electrode active material and the secondary battery.

(Evaluation of Initial Discharge Capacity and Positive Electrode Resistance)

Figure 4:
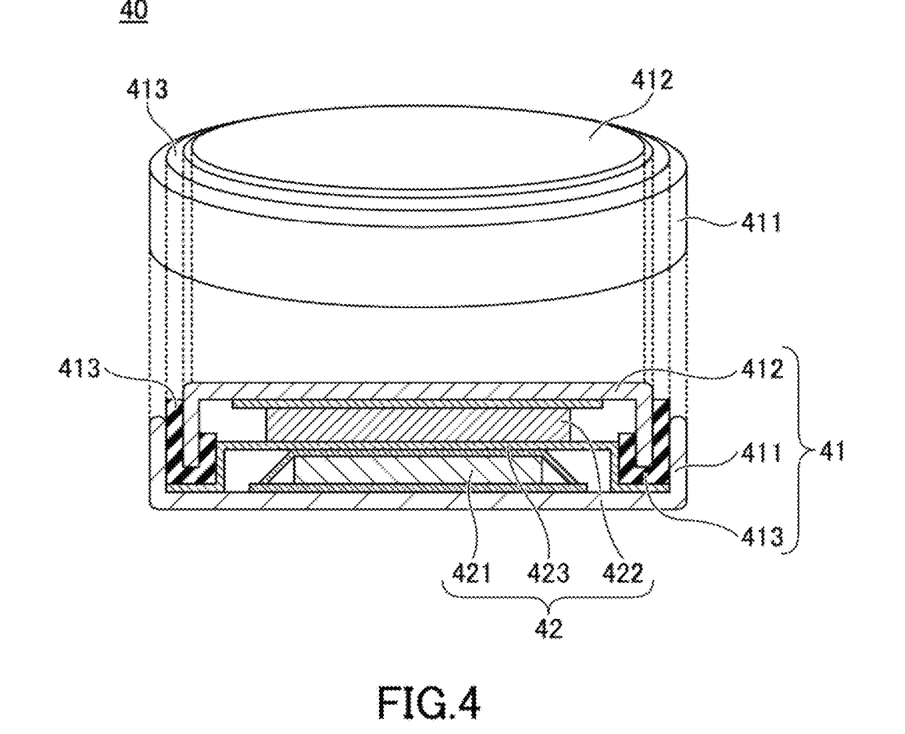
FIG. 4 is a schematic cross-sectional view of a 2032 coin-type battery used for battery evaluation in Examples and Comparative Examples.

To evaluate the initial discharge capacity and the positive electrode resistance of the positive electrode active material, a 2032 coin-type battery 40 (hereinafter referred to as a coin-type battery) shown in FIG. 4 was used. As shown in FIG. 4, the coin-type battery 40 includes a case 41 and an electrode 42 housed in the case 41.

The case 41 has a positive electrode can 411 that is hollow and has one end opened, and a negative electrode can 412 that is placed in the opening of the positive electrode can 411. When the negative electrode can 412 is placed in the opening of the positive electrode can 411, a space for accommodating the electrode 42 is formed between the negative electrode can 412 and the positive electrode can 411.

The electrode 42 includes a positive electrode 421, a separator 423 and a negative electrode 422, which are laminated in this order. The electrode 42 is housed in the case 41 so that the positive electrode 421 contacts the inner surface of the positive electrode can 411 and the negative electrode 422 contacts the inner surface of the negative electrode can 412.

The case 41 is provided with a gasket 413, and relative movement is fixed by the gasket 413 so that the positive electrode can 411 and the negative electrode can 412 maintain a non-contact state. Further, the gasket 413 also has a function of sealing the gap between the positive electrode can 411 and the negative electrode can 412 and air-tightly and liquid-tightly blocking the inside and the outside of the case 41. The coin-type battery 40 shown in FIG. 4 was produced as follows.

First, 52.5 mg of the positive electrode active material for non-aqueous electrolyte secondary batteries prepared in the following Examples and Comparative Examples, 15 mg of acetylene black and 7.5 mg of polytetrafluoroethylene resin (PTFE) were mixed. The mixture was press-molded by a pressure of 100 MPa to form a diameter of 11 mm and a thickness of 100 μm. The produced molded body was dried in a vacuum dryer at 120° C. for 12 hours to obtain a positive electrode 421.

Using the positive electrode 421, the negative electrode 422, the separator 423 and the electrolytic solution, the coin-type battery 40 shown in FIG. 4 was produced in a glove box in an Ar atmosphere whose dew point was controlled at −80° C. As the negative electrode 422, a negative electrode sheet in which a copper foil was coated with graphite powder having an average particle size of about 20 μm and polyvinylidene fluoride, which was punched into a disk shape with a diameter of 14 mm, was used.

A 25 μm thick polyethylene porous film was used as the separator 423. As an electrolytic solution, a equivalent mixed solution (manufactured by Toyama Pharmaceutical Co., Ltd.) of ethylene carbonate (EC) and diethyl carbonate (DEC) using 1M of $LiClO_4$ as a supporting electrolyte was used.

The initial discharge capacity and the positive electrode resistance showing the performance of the produced coin-type battery 40 were evaluated as follows.

Regarding the initial discharge capacity, first, the coin-type battery 40 was produced and left for about 24 hours. Then, once the open circuit voltage (OCV) was stable, the battery was charged until the cut-off voltage reached to 4.3 V with the current density of 0.1 $mA/cm^2$ with respect to the positive electrode. One hour after charging, the capacity when discharged to a cutoff voltage of 3.0 V was defined as the initial discharge capacity.

The positive electrode resistance was evaluated by the following procedure.

When the coin-type battery 40 was charged at a charging potential of 4.1 V and measured by an AC impedance method using a frequency response analyzer and a potentiogalvanostat (Solartron, 1255B), the Nyquist diagram (Nyquist plot) shown in FIG. 3A was obtained. This Nyquist diagram is expressed as the sum of the characteristic curves showing the solution resistance, the negative electrode resistance and its capacitance, and the positive electrode resistance and its capacitance. Therefore, the value of positive electrode resistance was calculated by performing a fitting calculation using the equivalent circuit shown in FIG. 3B based on the Nyquist diagram.

The positive electrode resistance was evaluated as a relative value with the evaluation result in Example 1 being 100.

(Evaluation of Cycle Characteristics)

Figure 5:
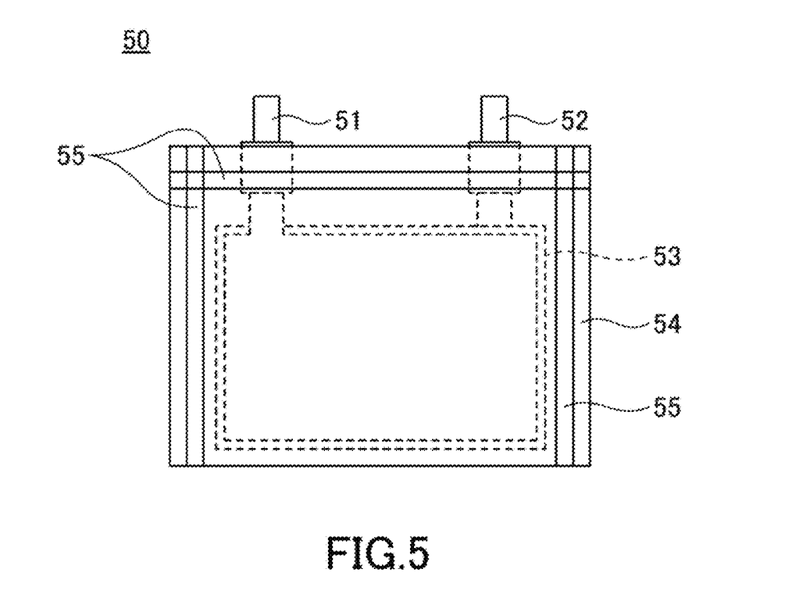
FIG. 5 is a schematic explanatory view of a laminated cell used for battery evaluation in Examples and Comparative Examples.

For the evaluation of cycle characteristics, the laminated cell 50 shown in the schematic explanatory view of FIG. 5 was used.

The laminate cell 50 was produced by the following procedure.

Using the positive electrode active material prepared in each of the examples and comparative examples, 85% by weight of the positive electrode active material, 10% by weight of acetylene black and 5% by weight of PVDF were mixed, and N-methyl-2-pyrrolidone was added as a solvent in an appropriate amount, followed by kneading to form a paste. The paste was applied to an aluminum current collector foil (0.02 mm in thickness), leaving a conductive portion connected to the outside, and dried. Then, the positive electrode sheet 51 having a basis weight of the positive electrode active material, that is, a positive electrode active material layer having a coating amount per unit area of 7 $mg/cm^2$ was formed.

Further, carbon powder (acetylene black) as a negative electrode active material was formed as a paste on a copper current collector foil (0.02 mm in thickness). In the same manner, the negative electrode sheet 52 having a basis weight of the negative electrode active material, that is, a negative electrode active material layer having a coating amount per unit area of 5 $mg/cm^2$ was formed.

A laminated sheet was formed by interposing a separator 53 made of a polypropylene microporous film (20.7 μm in thickness and 43.9% of porosity density) between the produced positive electrode sheet 51 and negative electrode sheet 52. Then, this laminated sheet was sandwiched between two aluminum laminate sheets 54 (0.55 mm in thickness), and three sides of the aluminum laminate sheets were heat-sealed to form heat-sealed portions 55, which were hermetically sealed. A laminated cell having a structure as shown in FIG. 5 was assembled.

Then, 260 μL of an electrolytic solution (manufactured by Ube Industries, Ltd) containing $LiPF_6$ (1 mol/L) dissolved in the electrolytic solution was injected to the mixture solvent of ethylene carbonate, ethylmethyl carbonate and dimethyl carbonate (3:3:4 in volume ratio). The laminated cell on the remaining side was heat-sealed to prepare a laminated cell 50 for gas generation test shown in FIG. 5 for evaluating the gas generation amount. The size of the produced laminated cell 50 was 60 mm in length and 90 mm in width.

Then, using the laminate cell 50, a charge/discharge cycle test (both charge and discharge at 2C, constant current mode) was performed at a temperature of 60° C. between a voltage of 3.0 V and 4.1 V, and the capacity retention rate after 500 cycles was evaluated. Here, C represents the C rate. The C rate represents the magnitude of the current value when a certain battery is energized, and the current value that discharges the entire capacity of the battery in 1 hour is defined as 1C.

Example 1

The lithium metal composite oxide represented by $Li_{10.0}Ni_{0.82}Co_{0.15}Al_{0.03}O_2$ was obtained by a known technique in which a metal composite oxide powder containing Ni as a main component and lithium hydroxide were mixed and fired. It was used as the base material. This lithium metal composite oxide powder had an average particle size of 12.4 μm and a specific surface area of 0.3 m$^2$/g. The average particle size was evaluated by using a volume cumulative average value in the laser diffraction scattering method, and the specific surface area was evaluated by using the BET method by nitrogen gas adsorption.

On the other hand, 15.6 g of tungsten oxide ($WO_3$) was added to an aqueous solution prepared by dissolving 3.3 g of lithium hydroxide (LiOH) in 100 mL of pure water having an electric conductivity of 0.8 μS/cm, and stirred. Thus, an aqueous solution of a tungsten compound was obtained.

Next, 75 g of the lithium metal composite oxide powder used as the base material was immersed in an aqueous solution of the above-mentioned tungsten compound whose temperature was adjusted to 25° C., and further stirred for 10 minutes to sufficiently mix the lithium metal composite oxide powder and washed with water. Then, solid-liquid separation was performed by suction filtration using a Nutsche, and a tungsten mixture (raw material mixture) composed of lithium metal composite oxide particles, a liquid component, and a tungsten compound was obtained. This tungsten mixture was dried, and the amount of water based on the mass before versus after drying was 7.5% by mass with respect to the lithium metal composite oxide particles (water washing step and mixing step).

When analyzed by ICP emission spectroscopy, the Li concentration of the liquid component was 1.71 mol/L, the tungsten content of the tungsten mixture was 0.0042 mol, and the molar ratio of Li was 2.5.

The obtained tungsten mixture was put into a stainless (SUS) baking container, heated to 100° C. and dried in a vacuum atmosphere for 12 hours. Further, the mixture was heated to 190° C. and heat-treated for 3 hours, and then the mixture was cooled to the room temperature in the container.

Finally, the obtained tungsten mixture was crushed with a sieve having openings of 38 μm. A positive electrode active material having a coating layer made of lithium tungstate on the surface of primary particles of the lithium metal composite oxide powder was obtained.

For the composition of resulting positive electrode active material, the content of tungsten and the ratio of Li/Mn were analyzed by ICP emission spectroscopy. The ratio of Ni:Co:Al was 82:15:3 in the atomic ratio. It was confirmed that the content of tungsten was 0.5 atomic percent with respect to the total number of atoms of Ni, Co and M. The ratio Li/Me thereof was 0.987, and the ratio Li/Me of the base material was 0.985. The tungsten content of the positive electrode active material is shown in Table 1 as the W concentration of the positive electrode active material.

The ratio Li/Me of the base material was determined by analyzing the lithium metal composite oxide powder washed with water under the same conditions with an ICP emission spectroscopy, using a lithium hydroxide solution containing Li at the same concentration as when washing with water.

[Analysis of Lithium Tungstate and Excess Lithium]

The compound form of lithium tungstate in the obtained positive electrode active material was evaluated by titrating Li eluted from the positive electrode active material.

Pure water was added to the obtained positive electrode active material and stirred for a certain period of time. Subsequently, the compound form of lithium eluted from the neutralization point that appeared when hydrochloric acid was added while measuring the pH of the filtered filtrate was evaluated. The presence of $Li_4WO_5$ and $Li_2WO_4$ was confirmed in lithium tungstate, and the abundance ratio of $Li_2WO_4$ contained in lithium tungstate was calculated to be 60% by mol. Further, the excess lithium was 0.02% by mass with respect to the total amount of the positive electrode active material.

[Morphological Analysis of Lithium Tungstate]

The obtained positive electrode active material was embedded in a resin and subjected to cross-section polisher processing to prepare an observation sample. When a cross-section of the sample was observed with an SEM at a magnification of 5000, it was confirmed that the obtained positive electrode active material was formed of the primary particles and the secondary particles formed by aggregation of the primary particles, and fine particles were formed on the surface of the primary particles. Note that, the surface of the primary particles includes the surface of the primary particles forming the surface of the secondary particles and the surface of the primary particles existing inside the secondary particles. The particle size of the fine particles was 20 nm or more and 400 nm or less. It was confirmed that the secondary particles having fine particles formed on the surface of the primary particles was 90% of the number of observed secondary particles, and fine particles were uniformly formed among the secondary particles. In addition, it was found that the fine particles were a different substance from the primary particles and the secondary particles, because the contrast of the fine particles with the primary particles and the secondary particles was different.

Furthermore, it was confirmed that a coating having a film thickness of 2 nm or more and 80 nm or less was formed on the surface of the primary particles when the vicinity of the surface of the primary particles of the obtained positive electrode active material was observed with a transmission electron microscope (TEM). It was confirmed that the coating was lithium tungstate from the analysis of electron energy loss spectroscopy (EELS).

It was confirmed that the following other examples also had a coating layer of the same form.

Furthermore, the electron diffraction pattern of the coating layer was acquired by the TEM-ED method (electron diffraction pattern acquisition step). As a result, as shown in FIG. 1, a diffraction spot 12 derived from a crystalline phase and a diffraction pattern (halo pattern) 13 derived from an amorphous phase were observed.

Of the diffraction patterns derived from the crystalline phase from the resulting electron diffraction pattern, the diffraction spots derived from the crystalline phase having the highest brightness, that is, the diffraction intensity having the highest diffraction intensity, were selected. Then, the diffraction spot was assigned to the (440) plane of $(Li_2WO_4)_7 \cdot 4H_2O$.

Next, the diffraction intensity pattern of the one-dimensional area A was extracted in the radial direction toward the (440) plane peak with the origin being the center of the zero-loss peak 11 of the acquired electron diffraction pattern. The diffraction intensity pattern is shown in FIG. 2.

In the diffraction intensity pattern shown in FIG. 2, the inflection point 20A generated between the region 211 of the zero-loss peak 21 and the other regions other than that is set as the end point of the region 211 of the zero-loss peak 21, and the region 211 of the zero-loss peak 21 was excluded from the integration region. The Savitzky-Golay method was used to calculate the differential values of the diffraction intensity pattern, and the point at which the absolute value of the differential value corresponds to 10% of the maximum value within the region of the zero-loss peak was defined as the inflection point 20A.

The area between the end point of the area 211 of the zero-loss peak 21 in the diffraction intensity pattern and the point 20B at which the diffraction intensity decreases to the background was set to the integration region, when the integration value Ia of the amorphous phase region 231 was calculated. The point 20B at which the diffraction intensity decreased to the background was the point where the distance from the center of the zero-loss peak in the reciprocal lattice space was 12 Å$^{-1}$.

As shown in FIG. 2, the crystalline phase region 221 and the amorphous phase region 231 were partially overlapped in the diffraction intensity pattern. Therefore, the point 20C of the diffraction intensity of the amorphous phase region 231 at the position where the crystalline phase region 221 and the amorphous phase region 231 start overlapping and the point 20D of the diffraction intensity of the amorphous phase region 231 at the position where the crystalline phase region 221 and the amorphous phase region 231 end overlapping are connected to a line. The area in which the diffraction intensity is smaller than the above line is considered as an amorphous phase region 231.

Then, a region having a higher diffraction intensity than the points 20C and 20D was set as the crystalline phase region 221.

As described above, the crystalline phase region 221 and the amorphous phase region 231 were separated, and the integral value Ic and the integral value Ia of the diffraction intensity of each region were calculated (diffraction intensity calculation step).

Next, for the integral value Ic of the diffraction intensity derived from the (440) plane of crystalline phase, the (111) plane of maximum diffraction intensity of $(Li_2WO_4)_7 \cdot 4H_2O$ described in ICDD (TCDD No. 00-035-0826) was divided by a diffraction intensity ratio of 0.24 to calculate a normalized integral value Ics (normalization step).

Then, the ratio (amorphous phase/crystalline phase) of the integral value Ia of the diffraction intensity derived from the amorphous phase to the normalized integral value Ics derived from the (440) plane of crystalline phase was 0.40 (ratio calculation step).

The ratio (Ia/Ics) between the integral value Ia and the normalized integral value Ics is shown as amorphous/crystalline in Table 1.

Therefore, it was confirmed that the coating layer was a mixed-phase of an amorphous phase and a crystalline phase.

Table 1 shows the evaluation results and the production conditions of the positive electrode active material.

Example 2

The positive electrode active material was produced in the same manner as in Example 1 except that the heat treatment time at the highest temperature of 190° C. after mixing the tungsten compound was 0.25 hours. Then, the crystallinity of the lithium tungstate particles of the coating layer formed on the particle surface of the lithium metal composite oxide powder was confirmed. The ratio of the integrated value Ia of the diffraction intensity derived from the amorphous phase to the normalized integrated values Ics derived from the crystalline phase (amorphous phase/crystalline phase) was 23.5.

Therefore, it was confirmed that the coating layer was a mixed-phase of an amorphous phase and a crystalline phase.

Table 1 shows the evaluation results and the production conditions of the positive electrode active material.

Example 3

The positive electrode active material was produced in the same manner as in Example 1 except that the highest temperature after mixing the tungsten compound was 120° C., and the heat treatment time at the highest temperature of 120° C. was 1 hour. Then, the crystallinity of the lithium tungstate particles of the coating layer formed on the particle surface of the lithium metal composite oxide powder was confirmed. The ratio of the integrated value Ia of the diffraction intensity derived from the amorphous phase to the normalized integrated values Ics derived from the crystalline phase (amorphous phase/crystalline phase) was 98.

Therefore, it was confirmed that the coating layer was a mixed-phase of an amorphous phase and a crystalline phase.

Table 1 shows the evaluation results and the production conditions of the positive electrode active material.

Example 4

The positive electrode active material was produced in the same manner as in Example 4 except that the heat treatment time at the highest temperature of 120° C. after mixing the tungsten compound was 10 hours. Then, the crystallinity of the lithium tungstate particles of the coating layer formed on the particle surface of the lithium metal composite oxide powder was confirmed. The ratio of the integrated value Ia of the diffraction intensity derived from the amorphous phase to the normalized integrated values Ics derived from the crystalline phase (amorphous phase/crystalline phase) was 0.35.

Therefore, it was confirmed that the coating layer was a mixed-phase of an amorphous phase and a crystalline phase.

Table 1 shows the evaluation results and the production conditions of the positive electrode active material.

Example 5

The positive electrode active material was produced in the same manner as in Example 1 except that the highest temperature after mixing the tungsten compound was 300° C., and the heat treatment time at the highest temperature of 300° C. was 0.1 hours. Then, the crystallinity of the lithium tungstate particles of the coating layer formed on the particle surface of the lithium metal composite oxide powder was confirmed. The ratio of the integrated value Ia of the diffraction intensity derived from the amorphous phase to the normalized integrated values Ics derived from the crystalline phase (amorphous phase/crystalline phase) was 0.24.

Therefore, it was confirmed that the coating layer was a mixed-phase of an amorphous phase and a crystalline phase.

Table 1 shows the evaluation results and the production conditions of the positive electrode active material.

Comparative Example 1

The positive electrode active material was produced in the same manner as in Example 1 except that the highest temperature after mixing the tungsten compound was 110° C., and the heat treatment time at the highest temperature of 110° C. was 1 hour. Then, the crystallinity of the lithium tungstate particles of the coating layer formed on the particle surface of the lithium metal composite oxide powder was confirmed. The ratio of the integrated value Ia of the diffraction intensity derived from the amorphous phase to the normalized integrated values Ics derived from the crystalline phase (amorphous phase/crystalline phase) was 170. However, when the peak used when calculating the diffraction intensity derived from the crystalline phase was confirmed, it was confirmed that the peak originated from the base material and the coating layer did not contain the crystalline phase. That is, it was confirmed that the coating layer consisted only of the amorphous phase.

Further, since the diffraction intensity at such a peak was almost the background, when the ratio of the integral value Ia to the normalized integral value Ics in which the value Ics was derived from the crystal phase was 150 or more, the coating layer was considered to be composed of only the amorphous phase.

Table 1 shows the evaluation results and the production conditions of the positive electrode active material.

Comparative Example 2

The positive electrode active material was produced in the same manner as in Example 1 except that the highest temperature after mixing the tungsten compound was 600° C., and the heat treatment time at the highest temperature of 600° C. was 3 hours. Then, the crystallinity of the lithium tungstate particles of the coating layer formed on the particle surface of the lithium metal composite oxide powder was confirmed. A halo pattern derived from the amorphous phase could not be confirmed.

That is, it was confirmed that the coating layer consisted only of the crystalline phase.

Table 1 shows the evaluation results and the production conditions of the positive electrode active material.

TABLE 1

| | Base material of positive electrode active material | Highest temperature (° C.) | Heating rate from 100° C. to highest temperature (° C./min) | Keeping time at highest temperature (hr) | Integral value of "temperature × time" at temperature area higher than 100° C. (° C.-hr) |
|---|---|---|---|---|---|
| Example 1 | $Li_{0.985}Ni_{0.82}Co_{0.15}Al_{0.03}O_2$ | 190 | 1 | 3 | 337.5 |
| Example 2 | $Li_{0.985}Ni_{0.82}Co_{0.15}Al_{0.03}O_2$ | 190 | 1 | 0.25 | 90.0 |
| Example 3 | $Li_{0.985}Ni_{0.82}Co_{0.15}Al_{0.03}O_2$ | 120 | 1 | 1 | 23.3 |
| Example 4 | $Li_{0.985}Ni_{0.82}Co_{0.15}Al_{0.03}O_2$ | 120 | 1 | 10 | 203.3 |
| Example 5 | $Li_{0.985}Ni_{0.82}Co_{0.15}Al_{0.03}O_2$ | 300 | 1 | 0.1 | 353.3 |
| Comparative Example 1 | $Li_{0.985}Ni_{0.82}Co_{0.15}Al_{0.03}O_2$ | 110 | 1 | 1 | 10.8 |
| Comparative Example 2 | $Li_{0.985}Ni_{0.82}Co_{0.15}Al_{0.03}O_2$ | 600 | 1 | 3 | 3583.3 |

| | W concentration of positive electrode active material (atomic percent) | Amorphous phase/ crystalline phase | Initial discharge capacity (mAh/g) | Positive electrode resistance | Capacity retention rate after 500 cycles (%) |
|---|---|---|---|---|---|
| Example 1 | 0.5 | 0.4 | 205.2 | 100 | 86 |
| Example 2 | 0.5 | 23.5 | 206.3 | 89 | 80 |
| Example 3 | 0.5 | 98 | 206.5 | 85 | 78 |
| Example 4 | 0.5 | 0.35 | 205.3 | 101 | 87 |
| Example 5 | 0.5 | 0.24 | 204.9 | 106 | 88 |
| Comparative Example 1 | 0.5 | 170 | 204.8 | 95 | 70 |
| Comparative Example 2 | 0.5 | 0 | 201.4 | 154 | 87 |

From the above results, it was confirmed that the coating layer of the positive electrode active material having the mixed-phase of crystalline phase and amorphous phase increased the discharge capacity and improved the durability by suppressing the positive electrode resistance when the non-aqueous electrolyte secondary battery was used.

Although the positive electrode active material for a non-aqueous electrolyte secondary battery has been described in the above embodiments and examples, the present invention is not limited to the above embodiments and examples. Various modifications and changes can be made within the scope of the gist of the present invention described in the claims.

The present application is based on and claims priority to Patent Application No. 2018-065969, filed on Mar. 29, 2018 with the Japan Patent Office, the entire contents of which are hereby incorporated by reference.

The invention claimed is:

1. A positive electrode active material for a non-aqueous electrolyte secondary battery comprising:

a lithium metal composite oxide powder represented by a general formula:

$Li_zNi_{1-x-y}Co_xM_yO_{2-\alpha}$, wherein $0<x\leq0.35$, $0\leq y\leq0.35$, $0.95\leq z\leq1.30$, $-0.15\leq\alpha\leq0.15$, and M is at least one element selected from Mn, V, Mg, Mo, Nb, Ti and Al; and a coating layer placed on particle surfaces of the lithium metal composite oxide powder;

wherein the coating layer is a mixed-phase of a crystalline phase and an amorphous phase.

2. The positive electrode active material for a non-aqueous electrolyte secondary battery according to claim 1, wherein an amorphous-phase/crystalline-phase ratio of the coating layer is 0.05 or more and 100 or less, and the ratio is calculated by:

an electron diffraction pattern acquisition step in which an electron diffraction pattern of the coating layer is acquired using a transmission electron microscope-electron diffraction pattern;

a diffraction intensity calculation step wherein a diffraction intensity pattern in a one-dimensional region is extracted from the acquired electron diffraction pattern, and an integral value Ic of a diffraction intensity of a crystalline phase region derived from a (lmn) plane which is a crystalline plane having a highest diffraction intensity of a crystalline phase contained in the coating layer and an integral value Ia of a diffraction intensity of an amorphous phase region derived from an amorphous phase contained in the coating layer are calculated from the acquired diffraction intensity pattern;

a normalization step in which a normalized integral value Ics is calculated by dividing the integral value Ic by a ratio of a diffraction intensity of the (lmn) plane when a diffraction intensity of a crystalline plane having a highest diffraction intensity in a powder X-ray diffraction pattern of the crystalline phase is regarded as 1; and a ratio calculation step in which a ratio of the integral value Ia to the normalized integral value Ics is calculated to obtain an amorphous-phase/crystalline-phase ratio of the coating layer.

3. The positive electrode active material for a non-aqueous electrolyte secondary battery according to claim 1, wherein the coating layer contains lithium tungstate.

4. The positive electrode active material for a non-aqueous electrolyte secondary battery according to claim 2, wherein the coating layer contains lithium tungstate.

* * * * *